Figure 1:
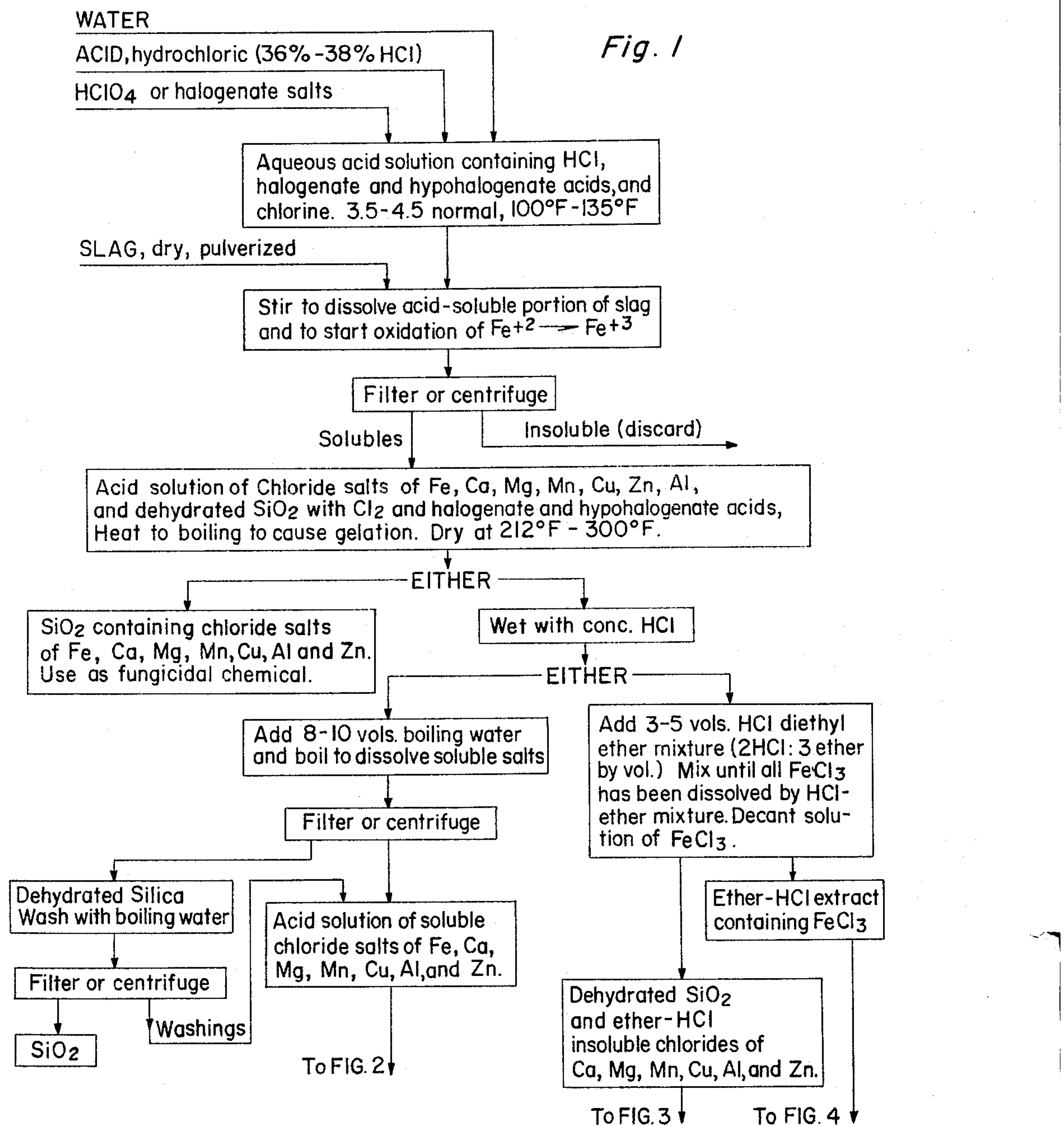
Figure 2:
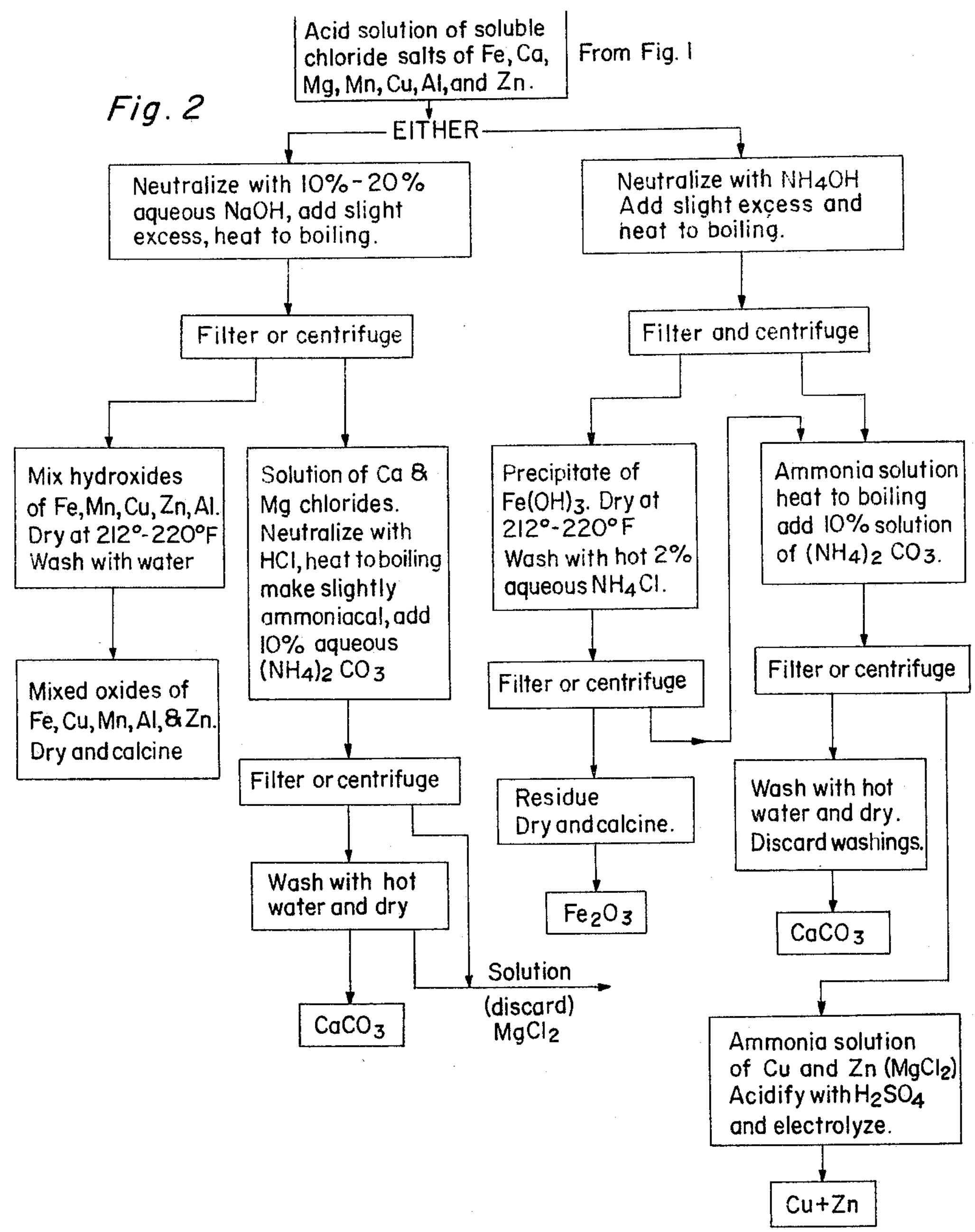
Figure 3:
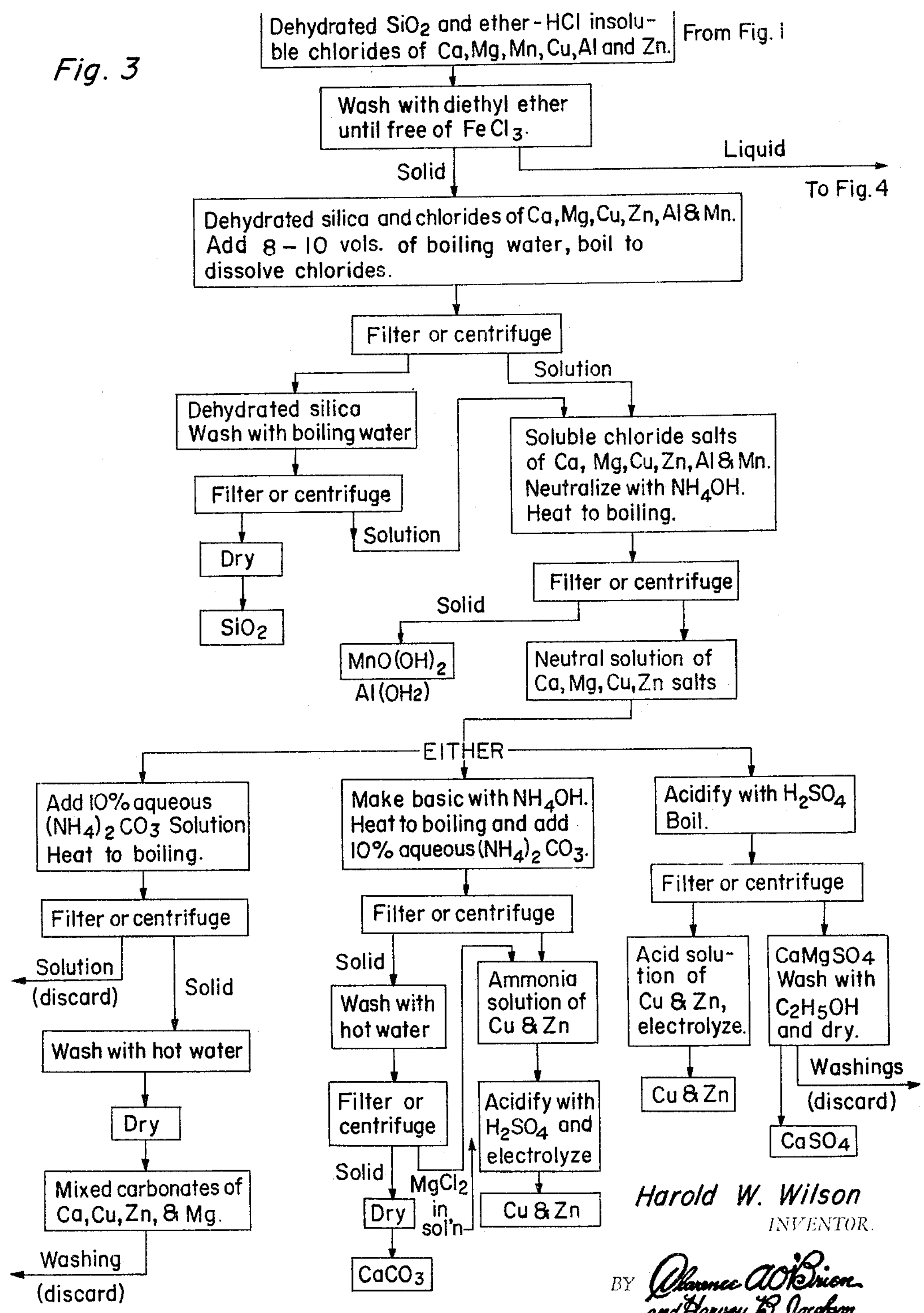

PROCESS FOR THE RECOVERY OF CERTAIN METALLIC AND NON-METALLIC CONSTITUENTS OF WASTE SLAG FROM REVERBERATORY REFINING OF COPPER PYRITIC TYPE ORES

Filed July 14, 1964 4 Sheets-Sheet 1

Harold W. Wilson
INVENTOR.

BY Clarence A. O'Brien and Harvey B. Jacobson
Attorneys

PROCESS FOR THE RECOVERY OF CERTAIN METALLIC AND NON-METALLIC CONSTITUENTS OF WASTE SLAG FROM REVERBERATORY REFINING OF COPPER PYRITIC TYPE ORES

Filed July 14, 1964 4 Sheets-Sheet 2

Harold W. Wilson
INVENTOR.

BY Clarence A. O'Brien and Harvey B. Jacobson
Attorneys

PROCESS FOR THE RECOVERY OF CERTAIN METALLIC AND NON-METALLIC CONSTITUENTS OF WASTE SLAG FROM REVERBERATORY REFINING OF COPPER PYRITIC TYPE ORES

Filed July 14, 1964

Harold W. Wilson
INVENTOR.

BY Clarence A. O'Brien and Harvey B. Jacobson
Attorneys

Nov. 29, 1966 H. W. WILSON 3,288,597
PROCESS FOR THE RECOVERY OF CERTAIN METALLIC AND NON-METALLIC CONSTITUENTS OF WASTE SLAG FROM REVERBERATORY REFINING OF COPPER PYRITIC TYPE ORES
Filed July 14, 1964 4 Sheets-Sheet 4
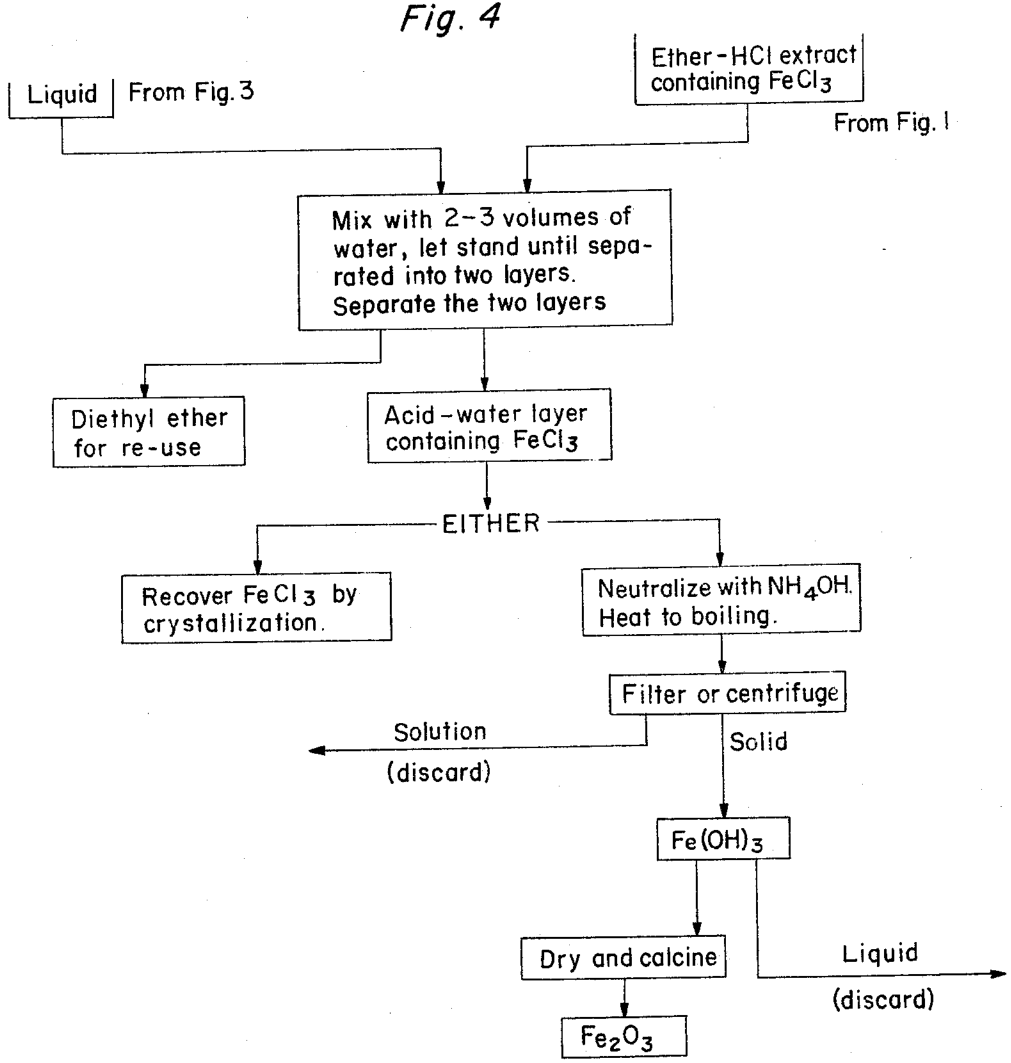
Harold W. Wilson
INVENTOR.
BY Clarence A. O'Brien and Harvey B. Jacobson
Attorneys United States Patent Office 3,288,597 Patented Nov. 29, 1966

1

3,288,597

PROCESS FOR THE RECOVERY OF CERTAIN METALLIC AND NON-METALLIC CONSTITUENTS OF WASTE SLAG FROM REVERBERATORY REFINING OF COPPER PYRITIC TYPE ORES

Harold W. Wilson, El Paso, Tex., assignor of fifty percent to Wilson Laboratories, Inc., El Paso, Tex., a corporation of Texas, ten percent to Jack W. Flowers, Waco, Tex., ten percent to James H. Maxey, Fresno, Calif., ten percent to David C. Casey, ten percent to Wesley D. Rogers, Jr., and ten percent to Vernon E. Thompson Filed July 14, 1964, Ser. No. 382,602
8 Claims. (Cl. 75—108)

This invention relates to the recovery of metallic and non-metallic values present in the waste slag resulting from reverberatory refining of copper pyritic type ores.

In my earlier copending United States patent applications Serial Number 348,063, filed February 28, 1964, and Serial Number 350,777, filed March 10, 1964, I have described processes for the separation, isolation, and recovery of certain metallic and non-metallic constituents of waste slag from reverberatory refining of copper pyritic type ores. In the processes described in these applications, mineral acids of approximately 4 normal concentration are employed to dissolve the acid-soluble portion of the waste slag producing an acid solution containing the acid-soluble components of the slag and an acid-insoluble residue which is discarded.

The present invention is directed to the treatment of pulverized slag of the same general composition as the slag described in the above noted pending applications but, in lieu of introducing oxidizing agents into the acidic solution after its separation from the insoluble residue as described in the above noted applications, the pulverized slag is initially treated with a 4 normal acid solution consisting principally of hydrochloric acid and containing lesser quantities of at least one acid selected from the group consisting of perchloric, chloric, chlorous, and hypochlorous—or with a 4 normal acid solution of hydrochloric acid containing chlorate, chlorite, or hypochlorite salts in such amount as to provide for the liberation of sufficient chlorine as to bring about complete oxidation of all soluble ferrous chloride formed from interaction of the hydrochloric acid with the acid soluble components of the slag and conversion of such ferrous chloride into ferric chloride.

Further in the process of the instant invention, instead of processing the acidic solution separated from the insoluble residue as in the processes described in my earlier patent applications, in the present process such solution is immediately converted into a gel state by heating the solution to a temperature between about 175° F. and up to the boiling point of the solution which is approximately 212° F. This heating not only causes the system to gel but the rate of reaction of oxidation of the ferrous iron to the ferric state is enhanced tremendously. As a result, smaller amounts of oxidizing agent are required than in the processes described in my earlier applications. After the gel has formed it is heated still further until it has been freed of its water content, the silica present has been dehydrated, and oxidation of all ferrous iron present into ferric iron has been completed. It is neither necessary or desirable to heat the gel much above 300° F. nor is it desirable to unnecessarily prolong the drying time at temperatures about 200° F. when lower drying temperatures might be employed. In either such case there is an undesirable formation of iron-oxygen complexes and a formation of some iron (ferric) oxide. Reasonably rapid drying at about 300° F. appears to insure the presence of some residual free hydrochloric acid which greatly retards the irreversible hydrolysis of the ferric chloride by minimizing the extent of dissociation, whereas prolonged drying and the use of excessive drying temperatures invariably produces unwanted oxygen complexes and ferric oxide.

During the dehydration of the gel it is desirable to have a continuing oxidation. In the present improved process this is accomplished by the use of the perchloric, chloric, chlorous or hypochlorous acids or their salts in acid medium which decompose into hypohalogen acids which are stronger oxidizing agents acting over a prolonged period to provide a continuing source of chlorine derived from the gradual decomposition of the halogenate acids during the drying step to yield chlorine and water.

The use of chlorate, chlorite, and hypochlorite salts in the presence of hydrochloric acid will bring about essentially the same reaction with the slag components since these acids each break down to yield chlorine, water and HCl.

Sulfuric acid cannot be employed in place of hydrochloric acid as the initial 4 normal acid since the reaction between sulfuric acid and the specified halogenate acids will produce chlorine dioxide which is highly explosive when brought in contact with strong reductants such as sulfide sulfur, powdered metals, etc. present in the slag.

In the drawings accompanying this application, various alternatives are shown for carrying out the improved process of this invention, the drawings being in the form of flowsheets.

One typical analysis of the waste slag from which various metallic and non-metallic values are to be recovered is:

28%–32% iron expressed as Fe (and present as metal oxides, and silicate);
32%–38% silicon dioxide (present as mixed silicates of iron, calcium, aluminum, and magnesium);
8%–10% expressed as CaO (present as basic silicate);
6%–8% expressed as $Al_2O_3$ (present as silicate);
2%–3% zinc;
Less than 0.5% lead;
0.3–0.5% copper; and
Less than 1% sulfur (as metal sulfides).

After the slag has been crushed to −200 mesh (Tyler standard) the dry slag is brought into contact with a suitable acid solution. As already indicated this is a mixture of HCl and other halogenate acids or their salts.

In the initial treatment of the pulverized slag with a 4 normal acid mixture of hydrochloric and perchloric acids, a ratio by volume of 13 parts of hydrochloric acid (Sp. G. 1.2, 38% HCl) to 1 part of perchloric acid (Sp. G. 1.6, 70% $HClO_4$) to 26 parts of water provided sufficient acidity to dissolve more than 40% by weight of the pulverized slag treated with such a mixture. The composition of the acid mixture reacted with 100 parts by weight of the slag was 85 parts by weight of acid and 130 parts by weight of water. In the preferred process the halogenate acid is added to the hydrochloric acid and this mixture of the two acids is then mixed with water immediately be-

2 fore the acid-water mixture is added to the pulverized slag, for, as in the previously disclosed patent applications describing the advantages of using such procedure, the same advantages hold true for this process in that the heats of solution and dilution produce an appreciable rise in the temperature of the water upon addition of the acids thereto. The use of a freshly prepared 4 normal acid solution for reaction with the slag greatly enhances the entire reaction as compared with the reaction when previously prepared 4 normal acid solution at atmospheric temperature is mixed with atmospheric temperature slag. Upon mixing a combination of 60 ml. of HCl (Sp. G. 1.19, 38% HCl) and 5 ml. of $HClO_4$ (Sp. G. 1.6, 70% $HClO_4$) with 130 ml. of water a temperature of 103° F. was obtained and upon adding this warm 4 normal acid solution to a 100 gram portion of slag a temperature of 156° F. was obtained. Using an acid mix of the same strength but at a temperature of 80° F. the reacting mixture of acid and slag only reached 132° F. temperature.

The following specific examples will serve to further illustrate that portion of the process which includes the dissolution of the pulverized waste slag and the preparation of a dried gel from the resulting acid solution.

One example of the procedure for obtaining the dried gel is as follows: 5 ml. of perchloric acid (Sp. G. 1.6, 70% $HClO_4$) were added to 65 ml. of hydrochloric acid (Sp. G. 1.10, 38% HCl) and this combination of acids was then mixed with 130 ml. of water. Immediately after its preparation this approximately 4 normal acid solution was added to, and mixed with, 100 grams of the pulverized slag (90% passing through 200 mesh U.S. Std. sieve) contained in a suitable container. After mixing the acid and slag for eight to ten minutes, the solution of the acid-solubles was separated from the acid-insolubles by centrifuging. The insoluble residue was discarded. While stirring, the solution of acid-solubles was heated to its boiling point and after 5–7 minutes of heating the solution formed a gel. Heat is used primarily to expedite gelation; however, the same degree of gelation occurs after about 1–2 hours of standing at atmospheric temperature and the resulting gel may be processed in the same manner as that obtained through heat application. The gel was further heated at 100°–150° C. temperature until freed of water. The dried gel may be used as such in agricultural applications as a fungicide and as a source of the plant nutrients: calcium, magnesium, iron, copper, zinc, and manganese—or the gel may be processed as hereinafter described and as shown in the flowsheet drawings forming a part of this description.

Another example of the procedure for obtaining the dried gel is as follows: One-half gram of potassium chlorate ($KClO_3$) was dissolved in 140 ml. of water to which was added 70 ml. of hydrochloric acid (Sp. G. 1.19, 37% HCl) and the warm solution resulting was immediately added to and mixed with 100 grams of waste slag. After 8–10 minutes of mixing, the insoluble solids were separated from the solution of acid solubles by filtration. The solution was transferred to a beaker and was heated to boiling. A gel formed within a time period of about five minutes. The gel was further heated to dryness and treated in the same manner as in the first example for recovery of the same products.

A third example of the improved process is as follows: Immediately after its preparation, a mixture of 70 ml. of hydrochloric acid (Sp. G. 1.19, 38% HCl) with 130 ml. of water was added to and mixed with 100 grams of the pulverized slag. After an initial mixing period of about 3–4 minutes ten ml. of a solution of sodium hypochlorite (5% NaClO in water) were added in small increments while the mixing was continued for a total time period of 8 minutes. Then the mixture was centrifuged to separate the acid solubles from the insoluble solids of the system. Centrifuge separation is preferred when solutions of hypochlorites are introduced in the described manner in order to minimize loss of chlorine from the system. The solution was transferred to a dish and immediately heated to a temperature of 125° C. to cause gelation and the production of a dried gel containing dehydrated silica and acid-soluble, metallic chlorides derived from the slag. The dried gel was utilized in the same manner as noted in the previous examples.

In still another example of this portion of the process the acidic solution obtained by the process described above, after its separation from the acid insoluble residue was transferred to a dish and allowed to stand at atmospheric temperature (about 80° C.) until it had gelled. Gelation required about one hour and twenty minutes. The gel was then heated at 100° C. temperature for approximately six hours, until dry. The dried gel was treated in the same manner as were the gels produced in the above described examples.

Equivalent results may be obtained using suitable quantities of 4 normal acid and strengths of acid ranging between 3.5 and 4.5 normal. The use of larger amounts of acid will dissolve larger amounts of the acid soluble components of the slag. The choice of the amount of acid to use is directly related to the economics involved. The amount of slag dissolved with the amount of acid specified in the above examples ranged from 35% to 40%. When larger amounts of 4 normal acid were used the amounts of slag dissolved also increased up to approximately 58% with the use of 250 ml. of 4 normal acid. Varying amounts and combinations of the halogenate acids and their salts can likewise be introduced, either directly with the 4 normal acid, or immediately following, or subsequent to the addition of the 4 normal acid to the slag. The results are similar in that the chlorine liberated during the reaction of the slag with the HCl and the halogenate acid or salt causes conversion of dissolved iron from its ferrous valence to its ferric valence, which is essential for complete separation and isolation of the ingredients in the subsequent processing hereinafter described. Although the hypochlorites appears to be the most satisfactory oxidants they should not be added all at one time since the liberation of chlorine takes place almost instantaneously and leaves little chlorine in the subsequent gel for effecting complete oxidation of all iron of the system.

It is also possible, to modify the procedure after the initial mixing of the 4 normal acid with the pulverized slag by passing chlorine gas into the slag-acid solution to accomplish oxidation, but in this modification the oxidation was not found to go as far towards completion as when halogenate acids and/or their salts were used. For optimum separation of the iron from the acid soluble portion derived from treatment of the slag, complete oxidation of the ferrous iron to the ferric state is essential. However, it is possible to effect a separation of all of the silica and the other constituents of the gel from more than 95% of the iron when only 80%–90% of the iron has been oxidized to the ferric state prior to further treatment of the gel.

As indicated in the drawings, the dried gel may be used as such or the dried gel may be treated by either of two processes depending upon the products desired. In either process, the dried gel is first wetted with sufficient hydrochloric acid (Sp. G. 1.19, 38% HCl) to insure that any small amount of ferric oxide which may be present as a result of the drying step is converted into ferric chloride.

Thereafter, the acid-wetted gel is treated with 8–10 volumes of water, the mixture is heated to boiling to dissolve the soluble chlorides and then the solution containing the soluble chlorides is separated from the insoluble silica by filtration or by centrifuging. The recovered silica is washed free of any occluded chlorides with hot water after which it is dried for use. The washings are added to the solution of soluble chlorides which is then treated with a base such as ammonium hydroxide or sodium hydroxide solution and then heated to boiling to cause formation of a precipitate of ferric hydroxide from the solution. The precipitate is then separated from solution by filtering or centrifuging.

When the precipitation has been effected with ammonium hydroxide, the precipitate is ferric hydroxide contaminated with a small amount of manganese hydroxide and the solution is an ammonia solution of the calcium, magnesium, manganese, copper and zinc. After filtering or centrifuging to separate the ferric hydroxide from the solution, the ferric hydroxide is dried at 212° F. to 220° F. and then washed with hot aqueous ammonium chloride, to remove any traces of the other salts. After refiltering or recentrifuging the solids are dried and calcined and recovered as $Fe_2O_3$.

The ammonia solution is heated to boiling and ammonium carbonate is added thereto to precipitate calcium carbonate leaving copper, zinc and magnesium in solution. The $CaCO_3$ is separated from the liquid by filtration or by centrifuging, washed with hot water and dried. The liquid, containing the copper and zinc is acidified with $H_2SO_4$ and electrolyzed to recover these metals.

When, instead of neutralizing the chloride solution with ammonium hydroxide, the solution is neutralized with aqueous NaOH or KOH, a slight excess of alkali is used and the solution is heated to boiling. As a result a mixture containing the hydroxides of iron, manganese, aluminum, copper and zinc precipitates and is separated from the solution of calcium and magnesium chlorides. The mixed hydroxide precipitate is dried at 212–220° F., washed with hot water, and then dried and calcined to yield a mixture of the oxides of iron, copper, manganese, aluminum and zinc.

The alkaline earth chloride solution is neutralized with HCl, heated to boiling, treated with a slight excess of ammonia and then with a 10% solution of ammonium carbonate to precipitate the calcium as calcium carbonate leaving the magnesium in solution. The solution is discarded and the recovered precipitate is washed and dried.

Instead of dissolving the metallic salts from the acid-wetted gel by means of boiling water, the acid-wetted gel is extracted with 3–5 volumes of a mixture consisting of 2 parts of hydrochloric acid by volume (Sp. G. 1.19, 38% HCl) and 3 parts of diethyl ether by volume, or with the same volume of isopropyl ether containing 8 moles of the same concentration hydrochloric acid per liter of mixture. The ether-acid mixture selectively dissolves the ferric chloride of the gel, leaving an insoluble residue of dehydrated silica and the chlorides of zinc, copper, manganese, aluminum and the alkaline earth metals contained in the gel. The ether-acid liquid phase is separated from the insolubles by decanting. Re-extraction of the insolubles with additional ether-acid mixture may be used to remove any ferric chloride remaining in the gel. The insolubles are washed with ether to remove any remaining acid-ether-ferric chloride and the washings added to the decanted acid-ether-ferric chloride extract. The acid-ether-ferric chloride solution plus washings is mixed with 2–3 volumes of water and thoroughly agitated. After standing a few minutes a clear ferric chloride-free ether layer separates as the upper layer and an aqueous acid solution containing the ferric chloride comprises the lower layer. The ether layer is poured off to be re-used in additional processing of new acid-wetted gel. Pure ferric chloride crystals may be recovered from the acidic aqueous solution by crystallization or the acidic ferric chloride may be treated with ammonium hydroxide to precipitate relatively pure ferric hydroxide which after drying at 100°–105° C. temperature, may be washed with boiling water, redried, and calcined to give a high purity ferric oxide product.

The dehydrated silica containing the ether-acid insolubles after being washed with diethyl ether to remove all trace of ferric chloride is treated with 8–10 volumes of boiling water and the mixture boiled to effect solution of the chlorides. Then the insoluble dehydrated silica is separated from the solution be filtering or centrifuging. After its separation, the silica is washed free of occluded soluble chlorides with boiling water and the washings are added to the solution containing the soluble chlorides. The silica is dried for use.

The solution of soluble chlorides is neutralized with ammonium hydroxide, heated to boiling, and filtered or centrifuged to remove trace amounts of solid manganese oxyhydroxide which are discarded. The neutral solution remaining after removal of the manganese oxyhydroxide may be processed by any one of three separate processes described as follows:

In the first process, a 5%–10% aqueous solution of ammonium carbonate solution is added to the neutral solution, the mixture is boiled, and then filtered or centrifuged to separate the precipitate of mixed carbonates of calcium, magnesium, copper, and zinc from the solution, which is discarded. The carbonate precipitate is washed free of occlusions with hot water and dried for use, or calcined to convert the carbonates to oxides.

In the second process, the neutral solution of chlorides is made basic with ammonium hydroxide, heated to boiling, a 5%–10% aqueous solution of ammonium carbonate added, the mixture boiled, and the filtered or centrifuged to precipitate the calcium carbonate from the ammonia solution of copper, zinc and magnesium salts. The precipitated carbonate is washed with hot water to free it from the soluble metal salts and the wash solution added to the orginal copper and zinc containing solution. The alkaline earth carbonate is dried for use. The ammoniacal solution freed of calcium carbonate is acidified with sulfuric acid and electrolyzed for the recovery of copper and zinc metals.

In the third process, the neutral solution of chlorides is acidified with sulfuric acid, boiled, and then filtered or centrifuged to give a precipitate of calcium and magnesium sulfate hydrate, which after washing with ethyl alcohol and discarding the washings is dried for use as alkaline earth sulfate hydrate. The solution obtained from filtration or centrifuging of the acidified chloride solution is electrolyzed for the recovery of copper and zinc metals.

Having described a preferred embodiment of my invention it is not intended that it be limited except as may be required by the appended claims.

What is claimed is:

1. A wet process for the separation, isolation and recovery of the acid-soluble metallic and non-metallic values in waste slag resulting from the reverberatory refining of copper pyritic type ores which comprises:

crushing the slag;

adding a warm solution consisting of HCl and at least one oxidizing agent selected from the group consisting of perchloric, chloric, chlorous, and hypochlorous acids and their salts to said slag, said solution having a normality of between 3.0 and 4.5 at the time it is added to the slag;

mixing the slag and acid to dissolve the acid solubles in said slag and to oxidize the ferrous iron therein to ferric iron;

separating the solid insoluble residue from the solution of silicic acid and the acid salts of the acid soluble iron, aluminum, copper, zinc, manganese, magnesium and calcium originally present in said slag;

forming a gel by removal of water from said separated solution; and recovering the iron, copper, calcium, silicon, zinc, magnesium and manganese values from said solution.

2. The process of claim 1 wherein the slag is digested with HCl and the oxidizing agent is added subsequently to the addition of HCl to the slag.

3. The process of claim 1 wherein the slag is digested with HCl and the oxidizing agent is added to the HCl immediately before the HCl is added to the slag.

4. The process of claim 1 wherein the silica is recovered from the gel by extracting the gel with boiling water.

5. The process of claim 1 wherein the gel is extracted with a mixture of HCl and ether and ferric chloride is recovered from the ethereal extract.

6. The process of claim 1 wherein the copper and zinc values are recovered from solutions of said metals, by electrolysis.

7. The process of claim 5 wherein the gel is wetted with HCl before extraction of the $FeCl_3$.

8. The process of claim 4 wherein the gel is wetted with HCl before the leaching of the water soluble metal chlorides therefrom.

No references cited.

DAVID L. RECK, *Primary Examiner.*

N. F. MARKVA, *Assistant Examiner.*